J. C. CONRAD.
COTTON MACHINE.
APPLICATION FILED FEB. 9, 1912.
1,113,310.
Patented Oct. 13, 1914.
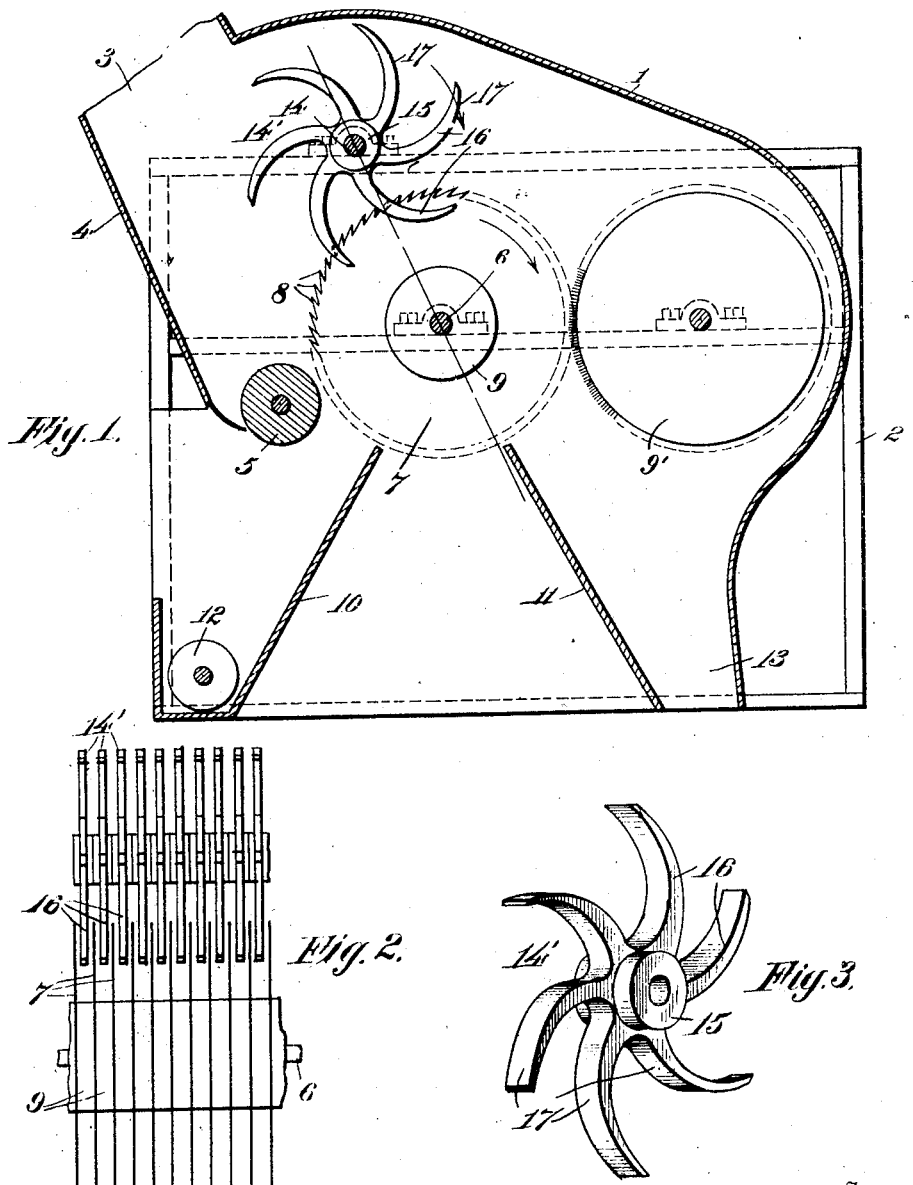

UNITED STATES PATENT OFFICE.

JOSHUA C. CONRAD, OF CEMENT, OKLAHOMA.

COTTON-MACHINE.

1,113,310.  Specification of Letters Patent.  Patented Oct. 13, 1914.

Application filed February 9, 1912. Serial No. 676,501.

*To all whom it may concern:*

Be it known that I, JOSHUA C. CONRAD, a citizen of the United States, residing at Cement, county of Caddo, and State of Oklahoma, have invented certain new and useful Improvements in Cotton-Machines, of which the following is a specification.

My invention relates to cotton machines and particularly to machines for separating the hulls from the seed cotton.

The object of my invention is to provide an improved machine for separating the hulls from the seed cotton which shall operate thoroughly and quickly and without injury to the seed cotton.

Other objects will appear hereinafter.

With these objects in view my invention consists generally in a plurality of rotary saws, a coacting brush, means for feeding the cotton mixed with the hulls to the saws, and means coacting with the saws for separating the seed cotton from the hulls.

My invention further consists in a plurality of spaced rotary saws in combination with a plurality of rotary members mounted to rotate on an axis substantially parallel to that of the saws and having arms adapted to pass through the spaces between said saws to coöperate with the same for the purpose mentioned.

My invention further consists in various details of construction and arrangements of parts all as will be fully described hereinafter and particularly pointed out in the claims.

My invention will be more readily understood by reference to the accompanying drawing forming a part of this specification and in which—

Figure 1 is a vertical transverse section through a device embodying my invention in its preferred form, Fig. 2 is a detail edge elevation of a number of the saws, and the co-acting rotary member, and Fig. 3 is a perspective view of one of the rotary members.

Referring now to the drawings 1 indicates a suitable casing mounted upon a frame 2 and provided with a feed inlet 3.

4 indicates the inclined front or breast of the machine at the lower end of which is arranged a feed roller 5. Mounted upon a transverse shaft 6 are a plurality of saws 7 having teeth 8 which are inclined in the direction of the rotation of the saws. The saws are spaced apart a suitable distance, that is, about three quarters of an inch to one and one quarter inches, by spacing blocks 9 on the shaft 6. The feed roller 5 lies in a plane below that of the shaft 6, but adjacent the peripheries of the saws. Upon the opposite side of the saws 8 is arranged a brush 9' similar to the ordinary gin brush.

Arranged beneath the saws are a pair of inclines 10 and 11 forming chutes for the hulls and the hulled cotton respectively, the former being arranged below the roller 5 and leading to a screw conveyer 12, and the latter leading to a discharge opening 13 which may communicate directly with a gin. Arranged above the saws and a little in front of the same is a shaft 14 upon which are mounted a plurality of rotary members 14'. These each comprise a hub 15 and a plurality of curved or bowed arms 16 which project between the saws as indicated clearly in Figs. 1 and 2. The members 14' rotate in the same direction as the saws and the arms 16 are bowed or convex in the direction of the rotation. The forward or convex edges 17 of the arms are straight in transverse cross section.

In operation the cotton is fed through the inlet 3 upon the breast 4 and is fed by the roller 5 to the saws 8. The seed cotton is carried over by the saws from which it is removed by the brush 9' and deposited upon the incline or chute 11 from whence it is discharged through the discharge opening 13. The hulls are engaged by the arms 16 of the rotary members 14' and are constantly being knocked back by the same. After the hulls are completely freed of the fiber they may pass freely between the roller 5 and the saws to the incline 10, but as long as any fiber adheres to the hulls the saws engage the fiber and draw the same back to be again engaged by the rotary members 14'. By this device the fiber is quickly and thoroughly separated from the hulls without injury to the fiber and it is to be understood that the cotton is not ginned in passing through the device but merely separated from the hulls.

Having described my invention what I claim as new and desire to secure by Letters Patent is:—

1. A cotton hulling machine comprising a cylinder of rotating saws, each saw being spaced from the adjacent saw by a spacing member, and means for feeding cotton to the lower edges of said saws, in combination with a plurality of rotating members mounted above and slightly in advance of and adapted to rotate in the same direction with said saws, each of said members comprising a plurality of arms presenting flat forward faces and convex in the direction of rotation and adapted to extend between the said saws, whereby all trash is removed from said saws when the latter and the former are in rotation, substantially as described.

2. A cotton hulling machine comprising a plurality of spaced rotary saws, an inclined cotton feeding breast, extending into proximity to said saws, a roller between said breast and said saws for conveying cotton to the latter, in combination with a plurality of rotary members adapted to rotate in the same direction with said saws, and arranged out of the path of the cotton on said breast and roller, and in advance of said saws; each member provided with a plurality of arms extending into the spaces between said saws and curved rearwardly with relation to its direction of rotation; and said arms having their forward faces straight transversely, substantially as described.

In testimony whereof I have signed my name to this specification in the presence of two subscribing witnesses.

JOSHUA C. CONRAD.

Witnesses:
R. M. DUGGER,
J. E. GILL.